Figure 1:
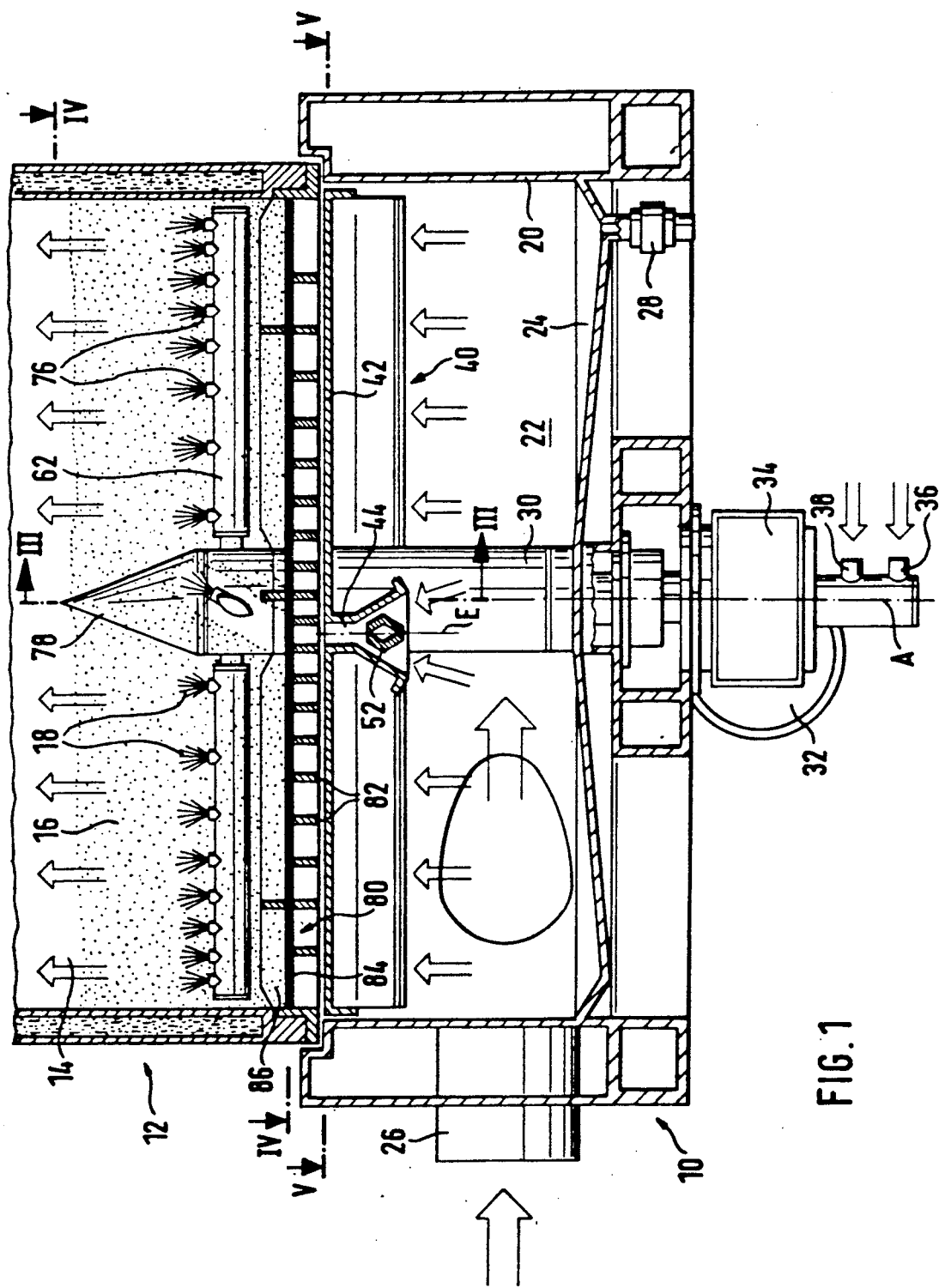

United States Patent [19]

Hüttlin

[11] Patent Number: 5,040,310
[45] Date of Patent: Aug. 20, 1991

[54] FLUIDIZED BED APPARATUS, IN PARTICULAR FOR GRANULATION OF PULVERULENT SUBSTANCE

[76] Inventor: Herbert Hüttlin, Daimlerstrasse 7, 7853 Steinen, France, 7853

[21] Appl. No.: 435,435
[22] PCT Filed: Feb. 28, 1989
[86] PCT No.: PCT/EP89/00193
§ 371 Date: Oct. 25, 1989
§ 102(e) Date: Oct. 25, 1989
[87] PCT Pub. No.: WO89/07977
PCT Pub. Date: Sep. 8, 1989

[30] Foreign Application Priority Data
Mar. 1, 1988 [DE] Fed. Rep. of Germany ....... 3806539

[51] Int. Cl.$^5$ .............................................. F26B 17/00
[52] U.S. Cl. ..................................... 34/57 A; 34/60; 159/DIG. 3
[58] Field of Search ............. 34/10, 57 A, 57 B, 57 C, 34/57 R, 57 D, 57 E, 60, 12, 60; 159/4.2, 17.1, 25.1, DIG. 3, 48.1, 4.01

[56] References Cited

U.S. PATENT DOCUMENTS 3,849,900 11/1974 Dale et al. .
3,867,114 11/1974 Dale et al. .
4,320,584 3/1982 Huttlin .

FOREIGN PATENT DOCUMENTS 2551578 5/1977 Fed. Rep. of Germany .

Primary Examiner—Henry A. Bennet
Attorney, Agent, or Firm—Brumbaugh, Graves, Donohue & Raymond

[57] ABSTRACT

In a container (12) a treatment space (14) for substance (16) is arranged, therebelow a wind chamber (22) and between the two a sieve bottom (80). Beneath the sieve bottom (80) a rotor (40) having a circular rotor disc (42) is arranged which is rotatably drivable about an upright central axis (A). The rotor (40) comprises at least one opening (44) which is elongated in approximately radial direction and which allows a gas stream (50) from the wind chamber (22) to pass through the sieve bottom (80) upwardly into the treatment space (14). The sieve bottom (80) comprises approximately radial blades (82) which are each arranged in an at least approximately vertical plane immediately above the rotor disc (42) in such a manner that they conduct the gas stream (50) in a sharply defined sector upwardly. In each sector-shaped gas stream (50) which has passed through the sieve bottom (80) distributed over the radial length thereof and rotating therewith on rotation of the rotor (40) nozzles (76) are arranged for spraying the substance (16) in the treatment space (14).

10 Claims, 5 Drawing Sheets

FLUIDIZED BED APPARATUS, IN PARTICULAR FOR GRANULATION OF PULVERULENT SUBSTANCE

The invention relates to a fluidized bed apparatus, in particular for granulation of pulverulent substance, comprising
a container in which a treatment space for the substance is arranged, therebelow a wind chamber and between the two a sieve bottom, and
a rotor having a circular rotor disc which is arranged beneath the sieve bottom, is rotatably drivable about an upright central axis and comprises at least one opening which is elongated in approximately radial direction and which permits a gas stream from the wind chamber through the sieve bottom upwardly into the treatment space.

In a fluidized bed apparatus belonging to this class and known from U.S. Pat. No. 3,849,900, which is provided for drying particles, the rotor consists of a vertical shaft with a flat circular disc. The latter has a somewhat greater diameter than the sieve bottom and has two or more circular-sector-shaped openings. The sieve bottom belongs to a drawer-like box which can be drawn out of the container and in its operating position is sealed with respect to the container by inflatable hose seals. One of said hose seals lies between a lower frame portion of the box surrounding the sieve bottom or tray and a step formed therebelow in the container. It is only beneath the latter that the rotor disc is arranged and consequently has a considerable vertical distance from the sieve bottom. In operation of this known fluidized bed apparatus heated dry air is blown from the wind chamber through the rotating rotor and through the sieve bottom into the treatment space so that a pulverulent substance therein, depending on the configuration of the rotor disc, is fluidized in one or more diffusely defined zones of the treatement space and dried.

Another fluidized bed apparatus known from DE 2932803 A1 comprises a rotor having a U-shaped profile in axial cross-section which is partially covered upwardly by a diaphragm provided with air exit openings. The rotor is mounted on a hollow shaft and connected drivably via the latter and to the pressure side of a fan. Extending upwardly within the hollow shaft is a liquid conduit which terminates in a stationary spray nozzle disposed centrally directly above the sieve bottom. The region around the rotor beneath the sieve bottom is constructed as suction chamber and connected to the suction side of the fan. In this known apparatus dry air from the hollow shaft is deflected radially outwardly into the U-shaped rotor profile to flow from there upwardly through the sieve bottom into the treatment space and to fluidize the substance contained therein. Through the central nozzle liquid is sprayed into the fluidized substance so that depending on the nature of the latter and the liquid an agglomeration granulate is for example formed or the particles of the already granulate-like substance are provided with a coating. The used air flows once again through the sieve bottom out of the treatment space into the suction chamber.

Furthermore, from DE 2551578 A1 a fluidized bed apparatus is known in which a treatment space is defined downwardly by a sealing bottom and upwardly by a filter arrangement. Arranged directly above the bottom is a two-vane or multi-vane rotor which is driven by a hollow shaft and is connected to the pressure side of a fan. The individual vanes of the rotor are provided with air exit openings which are rearwardly directed with respect to the direction of rotation. In one embodiment of this known apparatus in the treatment space a liquid nozzle is disposed centrally above the rotor. In another embodiment liquid nozzles are installed into the vanes of the rotor in such a manner that liquid is sprayed specifically into zones of the treatment space in which the substance is fluidized by the air emerging from the rotor.

The invention is based on the problem of further developing a fluidized bed apparatus in such a manner that compared with the known apparatuses described it requires less energy and time expenditure per unit weight of the substances to be processed and is particularly suitable for granulating difficultly fluidizable substances.

The problem is solved according to the invention in that
the sieve bottom comprises approximately radial blades which are each arranged in an at least approximately vertical plane directly above the rotor disc in such a manner that they conduct the gas stream upwardly in a sharply defined sector and
in each sector-shaped gas stream which has passed through the sieve bottom distributed over the radial length thereof and rotating therewith on rotation of the rotor nozzles are arranged for spraying the substance in the treatment space.

The blades according to the invention effect a bundling of the gas streams which even after their entrance into the substance to be treated remain in tact for a surprisingly long time so that the fluidizing of the substance in contrast to the known apparatuses described does not take place in diffusely defined regions but in sharply defined zones. In each of said zones a nozzle group is arranged in an upwardly directed gas stream which sets the substance to be treated in vigorous but nevertheless uniform gentle movement so that the substance can be sprayed with a relatively large amount of liquid per unit time and also can be dried again particularly rapidly. The blades are preferably arranged exactly radially but certain deviations from an exact radial direction may be allowed for all blades, in particular when the longitudinal direction of the openings deviate in the same manner from an exact radial direction.

In a preferred embodiment of the invention a vertically adjustable valve body elongated in the same direction as each opening is associated with the latter. By preferably automatic vertical adjustment of the valve bodies it is possible to prevent in the case of nonuniform distribution or nature of the substance in the treatment space one of several openings of the rotor being traversed by a disproportionately large amount of the total available gas stream.

This embodiment is advantageously further developed in that
the or each opening of the rotor is defined by side walls which are each arranged in an at least approximately vertical plane and the height of which is at least as great as their distance from each other and
the valve bodies are suspended beneath the associated side walls between two upwardly converging guide plates.

In the sense of a sharp definition of the air stream it is expedient for the blades to have a height which is at least as great as the greatest distance of the blades from each other.

In the same sense it is advantageous for the distance between adjacent blades to be smaller than the width of each opening of the rotor with respect to any points of the blades and the openings located equal distances from the upright axis.

It is further expedient for the blades to be connected together by a ring which is coaxial with the rotor disc and the lower side of which forms a track for at least one roller mounted on the rotor. This makes it possible to arrange the rotor disc at a very small axial distance from the blades and this likewise contributes to avoiding undesirable vortices in the upwardly directed gas stream.

The rotor is expediently drivable by a central shaft which extends through the sieve bottom upwardly and above said bottom in each sector-shaped gas stream carries a radial arm on which a group of nozzles is arranged. The nozzle group or the nozzle groups may however also have associated therewith a separate drive which is synchronized with the drive of the rotor.

Preferably, each arm is rearwardly offset seen in the direction of rotation of the rotor with respect to the associated opening from which it is subjected to the flow.

It is further advantageous for each arm to have an airfoil-like profile and to be rotationally adjustable about its own at least approximately radial axis. This makes it possible to vary the direction in which the airfoil profile is attacked by the fluidized substance and the direction in which the nozzles spray the fluidized substance in accordance with the nature of said substance.

Figure 2:
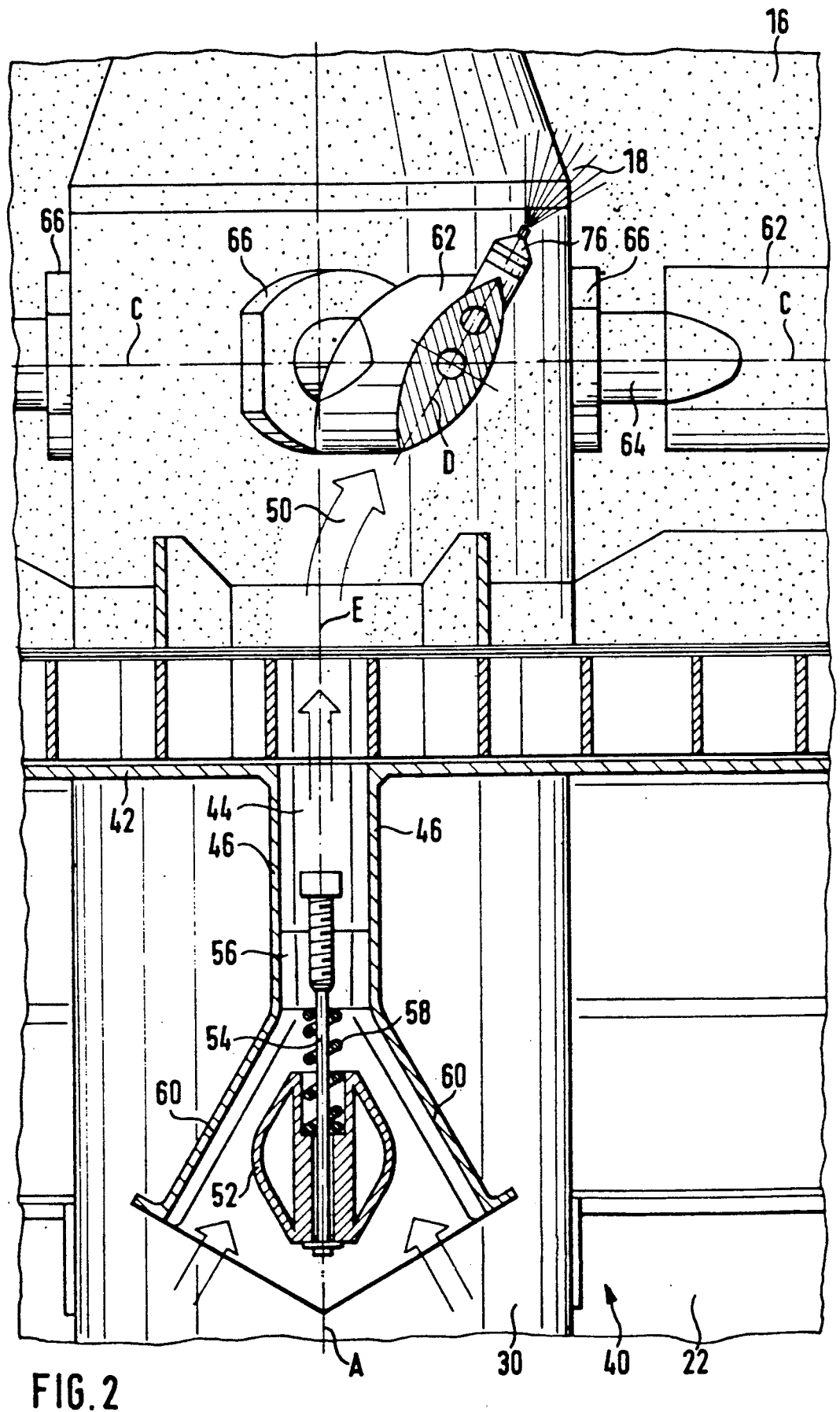
Figure 3:
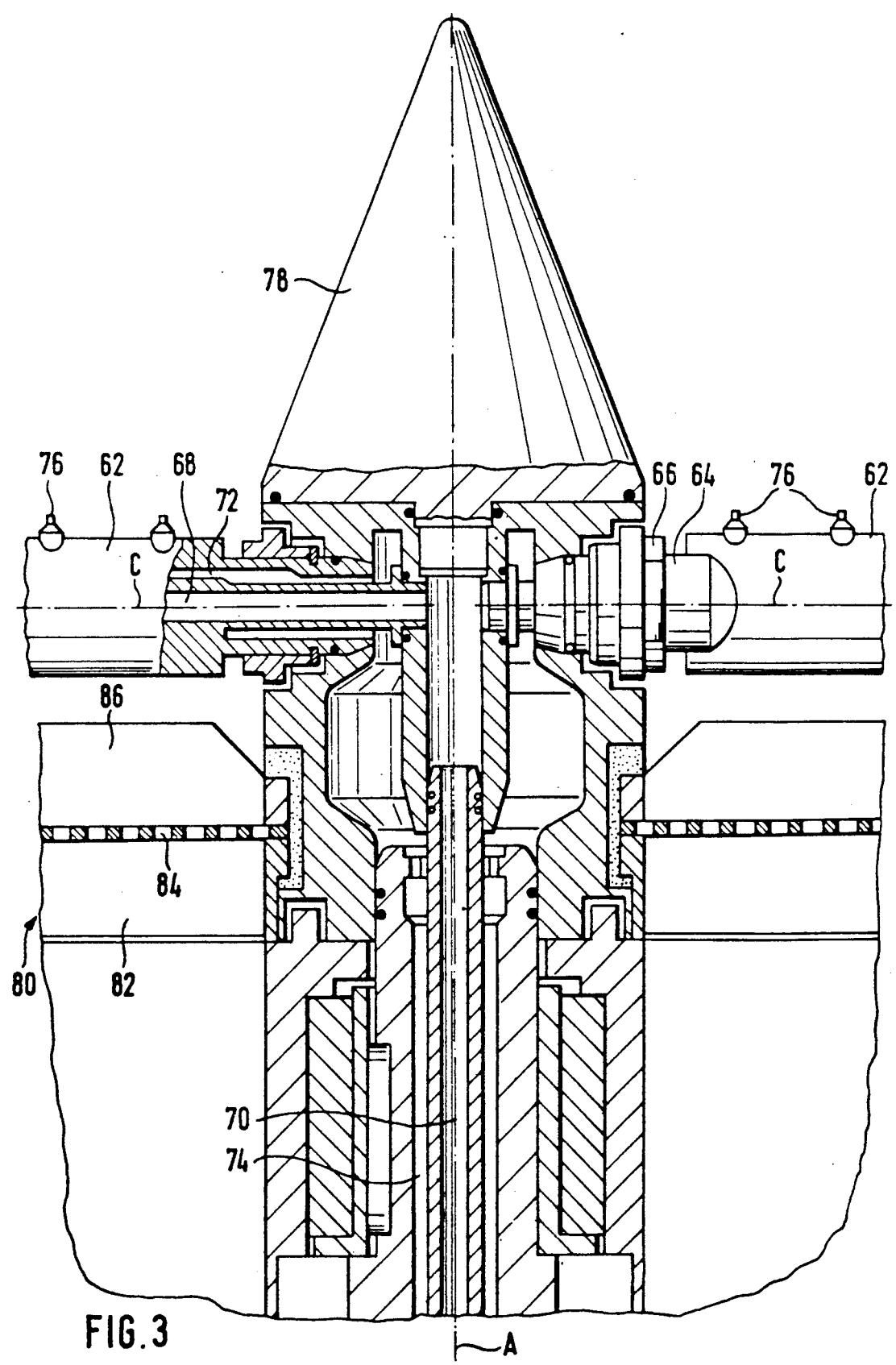
Figure 4:
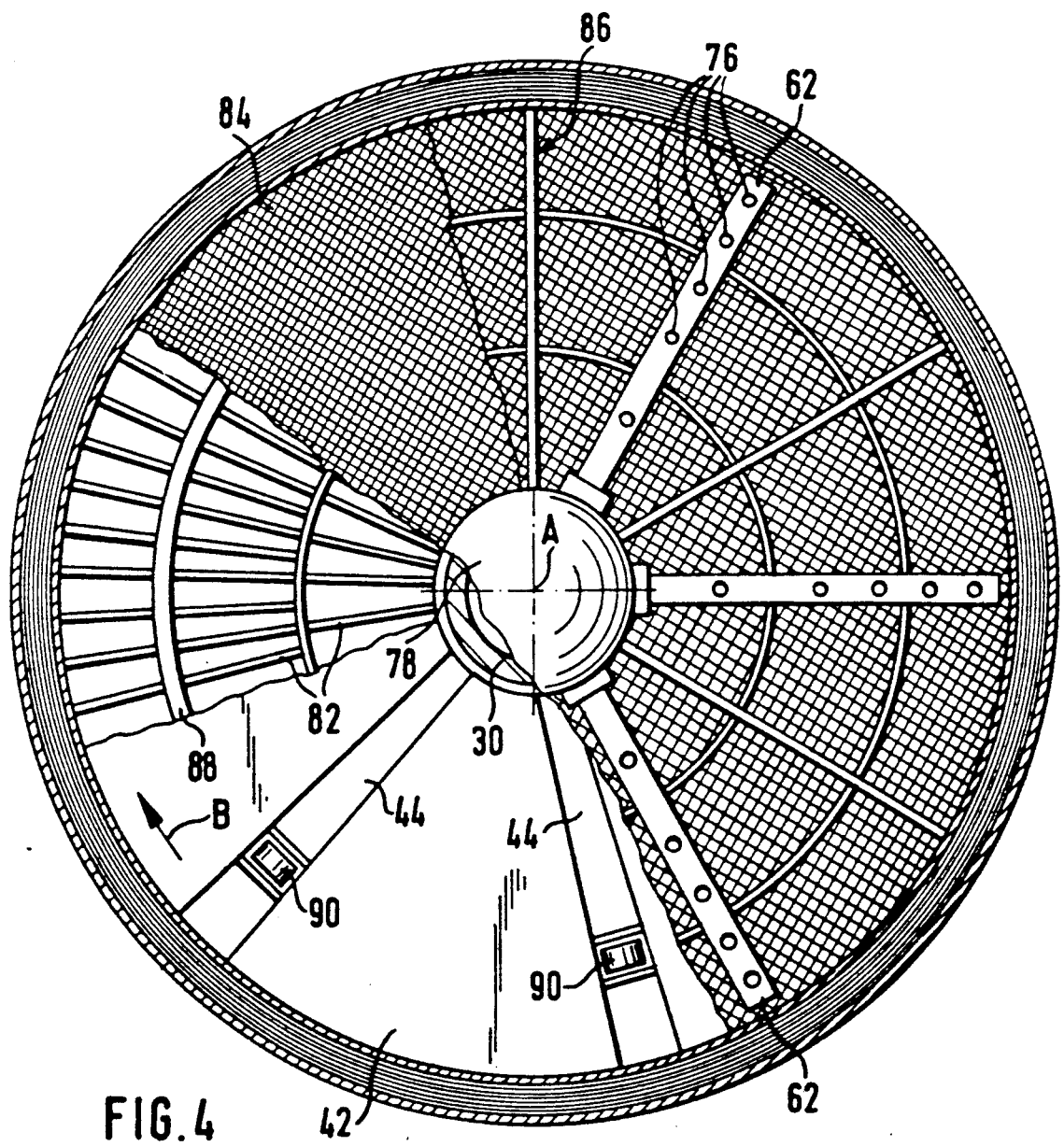
Figure 6:
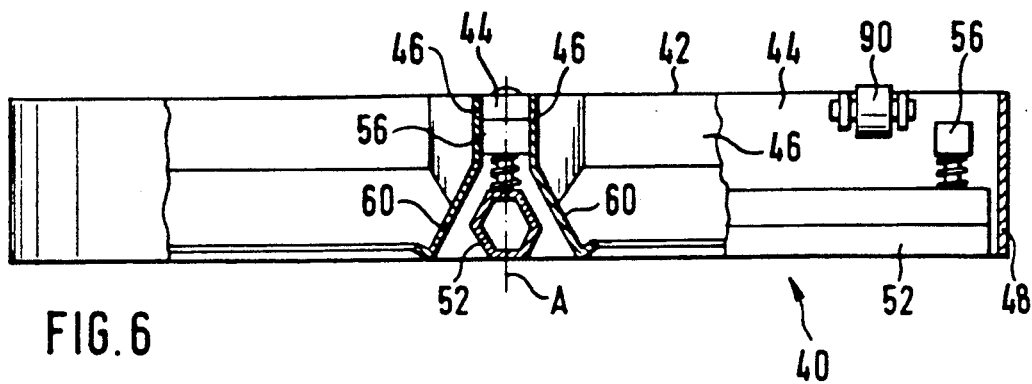
Figure 5:
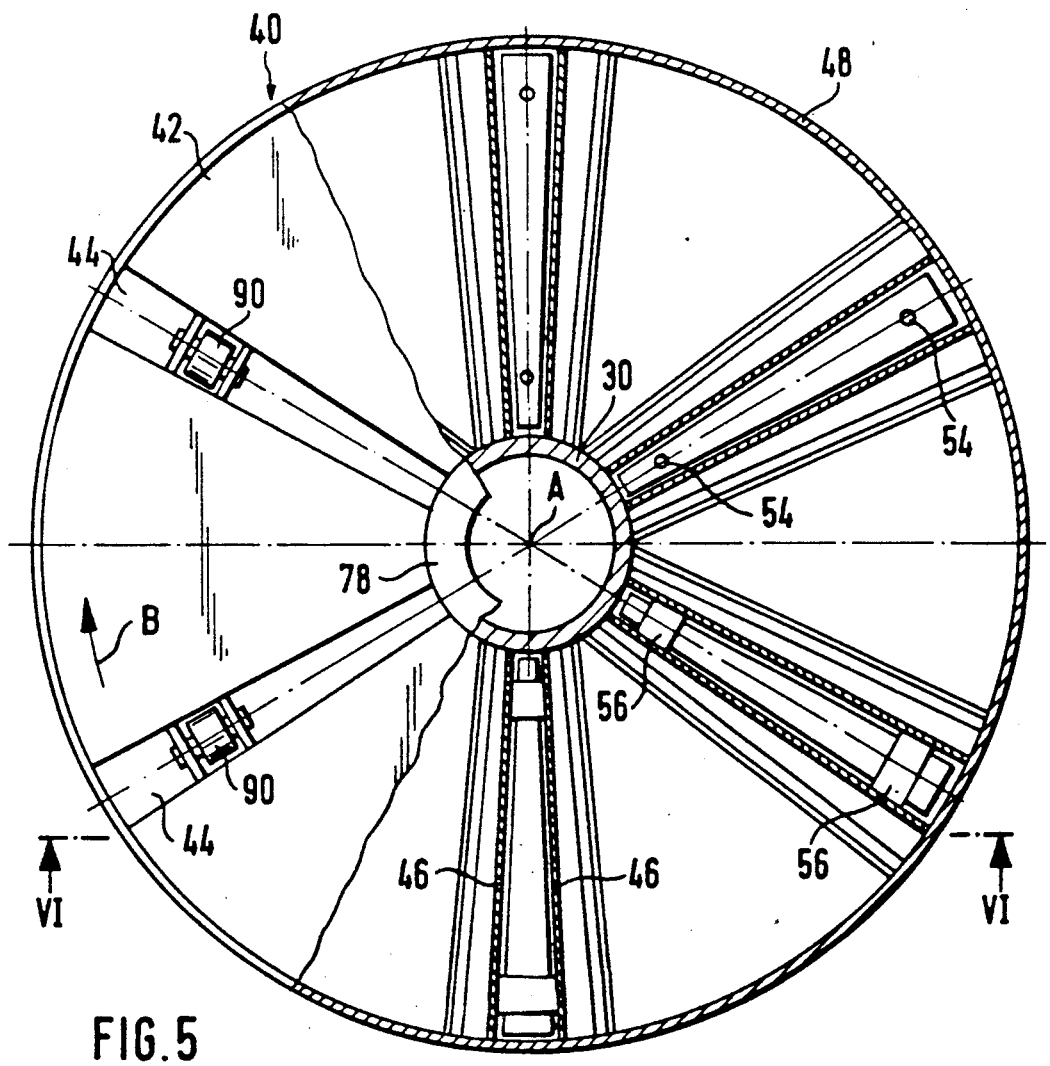

Finally, it is advantageous if at each arm the distance of the nozzles from each other decreases with increasing distance from the central axis. This step contributes to substantial uniform spraying of the substance in all regions of the treatment space irrespective of whether they are further from or closer to the central axis.

Examples of embodiment of the invention will be described with further details hereinafter with the aid of schematic drawings, wherein:

FIG. 1 is a side view shown partially as axis-parallel section of a fluidized bed apparatus according to the invention, FIG. 2 is an enlarged fragment from FIG. 1, FIG. 3 is the axial partial section III—III in FIG. 1, FIG. 4 is the section IV—IV normal to the axis in FIG. 1, FIG. 5 is the partial section V—V normal to the axis in FIG. 1, and FIG. 6 is the section VI—VI in FIG. 5.

The fluidized bed apparatus illustrated has a lower frame 10 carrying a container 12. The container 12 contains a cylindrical treatment space 14 which in operation is partially filled with the substance 16 to be treated. The substance 16 is for example pulverulent and in the fluidized state is to be sprayed with the liquid 18 to form a granulate. The container 12 is of usual design and thus illustrated only in the lower region of interest here. The treatment space 14 is expediently bordered at the top by a filter arrangement; examples of such arrangements are known from U.S. Pat. No. 3,849,900 and DE 2551578 A1 cited at the beginning.

The lower frame 10 has a cylindrical casing 20 which encloses a wind chamber 22. The latter is defined at the bottom by a bottom 24 and has an inlet air connection 26 through which a gas, for example dry hot air, can be introduced for fluidizing the substance 16. A drain valve 28 is arranged at the bottom 24. A hollow shaft with vertical geometrical axis A extends through the bottom 24. The shaft 30 is rotationally drivable by a motor 32 via an infinitely variable transmission 34. At the lower end of the hollow shaft 30 a liquid inlet 36 and a compressed air inlet 38 are arranged.

Mounted on the shaft 30 is a rotor 40 which comprises as upper boundary of the wind chamber 22 a circular rotor disc 42. The outer diameter of the rotor disc 42 is approximately as large as the inner diameter of the casing 20 and in the example of embodiment illustrated is somewhat greater than the inner diameter of the container 12 which starts directly above the rotor disc 42. The rotor 40 has a plurality, six in the example illustrated, of openings 44 which are offset at equal angular intervals with respect to each other, of 60° in the example illustrated, and each have the form of a narrow annular sector.

Each of the openings 44 is defined by a pair of vertical radially outwardly diverging side walls 46 which extend from the hollow shaft 30 up to a cylindrical outer collar 48. The side walls 46 and the outer collar 48 are connected together at the top by the rotor disc 42 which is cut away corresponding to the openings 44 so that each of the openings allows a vertical gas stream 50 of circular-sector-shaped cross-section to emerge upwardly out of the wind chamber 22 when a corresponding pressure gradient is generated from the wind chamber 22 to the treatment space 14 by a fan connected to the inlet air connecting piece 26.

Beneath each of the openings 44 a valve body 52 is suspended with a pair of rods 54 on the rotor 40 and guided upwardly displaceably. Each of the valve bodies 52 extends in the same radial direction as the associated opening 44 and like the latter has a cross-section increasing with increasing distance from the axis A. The rods 54 are each vertically adjustably secured to a narrow bridge 56 which bridges the associated opening 44. For this purpose an upper portion of each rod 54 is provided with an external thread and the associated bridge 56 with an internal thread. Around each rod 54 a spring 58 is arranged which bears on the lower side of the associated bridge 56 and tends to hold the valve 52 against the action of said pressure gradient in its lower end position defined by the set length of the rods 54.

Each of the valve bodies 52 is arranged exactly centrally between two guide plates 60 which extend downwardly from the associated pair of side walls 46 and diverge downwardly in cross-section as shown in FIG. 2. Between each of the guide plates 60 and the associated valve body 52 a radial slot is left having a width which decreases when the valve body 52 is displaced upwardly against its own weight and against the pressure of the associated springs 58 due to an excessive pressure gradient between its lower side and upper side.

Secured at a distance above the rotor 40 to the shaft 30 are several arms 62 which each extend radially outwardly above one of the openings 44 up to the vicinity of the inner wall of the container 12. The number of arms 62 corresponds to the number of openings 44; thus, in the example illustrated six arms 62 are arranged offset with respect to each other by equal intervals of 60°. With respect to the operating direction B of rotation of the rotor 40 each of the arms 62 is slightly offset rearwardly with respect to the associated opening 44 arranged below it.

Each of the arms 62 has a tubular connecting piece 64 which is inserted into a radial bore of the shaft 30 and screwed tight with a nut 66. After releasing its nut 66 each arm 62 can be turned about its axis C radial with respect to the shaft 30. As FIG. 2 in particular shows the profile of the arm 62 is similar to the profile of an airfoil; it has a plane of symmetry D which intersects the plane of the rotor disc 42 approximately in the centre plane E of the associated opening 44.

Within each arm 62 a central passage 68 is formed and is connected via an axial passage 70 in the shaft 30 to the liquid inlet 36. A further passage 72 in each arm 62 is connected via a further passage 74 in the shaft 30 to the compressed air inlet 38. At an edge of each arm 62 directed obliquely upwardly rearwardly with respect to the rotational direction B of the shaft 30 a plurality of nozzles 76 are arranged of which the axes lie in the plane of symmetry D of the associated arm 62 and extend at right-angles to the axis C thereof. The nozzles 76 are two-substance nozzles in which a liquid supplied through the liquid inlet 38 is sprayed with compressed air. The distances between every two nozzles 76 decrease with increasing distance from the axis A so that in all regions of the treatment space 14 approximately identical liquid amounts per unit area are sprayed in.

The shaft 30 has a conical upper end 78 of which the tip extends into the region of the normal upper boundary of the substance 16 fluidized in the treatment space 14.

Between the rotor 40 and the arms 62 a sieve bottom 80 is arranged which defines the treatment space 14 downwardly and through which the shaft 30 extends. The sieve bottom 80 comprises as supporting components blades 82 which are arranged in star manner and which each lie in a plane containing the axis A, i.e. a vertical plane. All the blades 82 are secured to the inner wall of the container 12; every other blade 82 extends up to the shaft 30; the remaining blades 82 terminate somewhat further radially outwardly. The blades 82 consist of thin metal sheet and define narrow sector-shaped intermediate spaces whose width at any distance from the axis A is smaller, preferably half as great, as the width of the intermediate space which every two associated side walls 46 leave between them at the same distance from the axis A. The height of the blades 82 is at least as great as the greatest width of the intermediate space between two adjacent blades measured in the peripheral direction.

Lying on the blades 82 is a sieve 84 which is fine-meshed enough to prevent the substance 16 from trickling into the wind chamber 22 when the gas stream between said chamber and the treatment space 14 is shut off. Lying on the sieve 84 is a grid 86 of radial webs and circular hoops; said grid 86 prevents the sieve 84 from moving upwardly when the pressure gradient provided for operation of the apparatus obtains between the wind chamber 22 and the treatment space 14. To prevent the rotor 40 from moving upwardly and scraping the blades 82 under the influence of this pressure gradient said blades are connected together by a ring 88 which is coaxial with the shaft 30 and the lower side of which forms a track for rollers 90 mounted on the rotor 40.

I claim:

1. Fluidized bed apparatus for granulation of a pulverulent substance, comprising
    a container in which a treatment space for the substance is arranged,
    a wind chamber below the container,
    a sieve bottom between the treatment space and the wind chamber, and
    a rotor having a circular rotor disc arranged beneath the sieve bottom, said rotor being rotatably drivable about an upright central axis and comprising at least one opening which is elongated in approximately radial direction and which permits a gas stream to flow from the wind chamber through the sieve bottom upwardly into the treatment space, wherein
    the sieve bottom comprises approximately radial blades which are each arranged in an upright plane directly above the rotor disc in such a manner that said blades conduct the gas upwardly in at least one sharply defined sectorial gas stream,
    the rotor is arranged in a manner that rotation thereof causes rotation of each sectorial gas stream flowing therethrough, and
    nozzles are arranged in each said sectorial gas stream for spraying the substance in the treatment space, said nozzles being distributed over the radial length of each sectorial gas stream for rotation with each sectorial gas stream on rotation of the rotor.

2. Fluidized bed apparatus according to claim 1, wherein
    each opening has associated therewith a vertically adjustable valve body elongated in the same direction as said opening.

3. Fluidized bed apparatus according to claim 2, wherein
    each opening of the rotor is defined by side walls which are arranged in an upright plane, said side walls having a height which is at least as great a the distance between side walls and
    the valve bodies are suspended beneath the associated side walls between two upwardly converging guide plates.

4. Fluidized bed apparatus according to claim 1, wherein the blades have a height which is at least as great as the greatest distance between the blades.

5. Fluidized bed apparatus according to claim 1, wherein the distance between adjacent blades is smaller than the width of each opening of the rotor with respect to any points of the blades and the openings which are located equal distances from the upright central axis.

6. Fluidized bed apparatus according to claim 1, wherein the blades are connected together by a ring which is coaxial with the rotor disc and the lower side of which forms a track for at least one roller mounted on the rotor.

7. Fluidized bed apparatus according to claim 1, wherein the rotor is drivable by a central shaft which extends upwardly through the sieve bottom and carries above the sieve bottom in each gas sector a radial arm on which a group of nozzles is arranged.

8. Fluidized bed apparatus according to claim 7, wherein each arm is rearwardly offset seen in the direction of rotation of the rotor with respect to the associated opening from which it is subjected to the flow.

9. Fluidized bed apparatus according to claim 7 or 8, characterized in that each arm has an airfoil-like profile and is rotatably adjustable about its own at least approximately radial axis.

10. Fluidized bed apparatus according to claim 7, wherein on each arm the distance of the nozzles from each other decreases with increasing distance from the upright central axis.

* * * * *